US008210583B2

(12) United States Patent
Wavde et al.

(10) Patent No.: US 8,210,583 B2
(45) Date of Patent: Jul. 3, 2012

(54) ENERGY ABSORBER DEVICE AND METHOD OF FORMING SAME

(75) Inventors: Amit A. Wavde, Sterling Heights, MI (US); Brian D. Van Buren, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 77 days.

(21) Appl. No.: 12/778,197

(22) Filed: May 12, 2010

(65) Prior Publication Data

US 2011/0278868 A1   Nov. 17, 2011

(51) Int. Cl.
*B60R 19/34* (2006.01)
(52) U.S. Cl. .................................. 293/132; 293/133
(58) Field of Classification Search ............. 296/187.03, 296/187.09, 187.11, 70, 187.05; 293/132, 293/133; 188/377
See application file for complete search history.

(56) References Cited

U.S. PATENT DOCUMENTS

| | | | |
|---|---|---|---|
| 3,236,333 A | 2/1966 | Mitchell | |
| 6,837,518 B2* | 1/2005 | Mullan | 280/752 |
| 7,021,686 B2* | 4/2006 | Glasgow et al. | 293/132 |
| 7,044,515 B2 | 5/2006 | Mooijman et al. | |
| 7,070,217 B2* | 7/2006 | Longo | 293/132 |
| 7,762,595 B2* | 7/2010 | Enderich et al. | 293/133 |
| 7,793,996 B2* | 9/2010 | Karlander | 293/133 |
| 7,823,939 B2* | 11/2010 | Handing et al. | 293/133 |
| 2004/0036264 A1* | 2/2004 | Mullan | 280/752 |
| 2004/0060790 A1* | 4/2004 | Wu et al. | 188/377 |
| 2005/0110285 A1* | 5/2005 | Glasgow et al. | 293/133 |
| 2005/0253403 A1* | 11/2005 | Longo | 293/133 |
| 2006/0022473 A1* | 2/2006 | Hansen | 293/133 |
| 2006/0066115 A1* | 3/2006 | Haneda et al. | 293/133 |
| 2006/0202493 A1* | 9/2006 | Tamura et al. | 293/133 |
| 2006/0255580 A1* | 11/2006 | Enders et al. | 280/753 |
| 2007/0040354 A1 | 2/2007 | Wacker et al. | |
| 2007/0182176 A1* | 8/2007 | Muskos | 293/133 |
| 2008/0106107 A1* | 5/2008 | Tan et al. | 293/133 |
| 2009/0026777 A1* | 1/2009 | Schmid et al. | 293/133 |

FOREIGN PATENT DOCUMENTS

| | | |
|---|---|---|
| DE | 4300284 A1 | 1/1994 |
| DE | 202005010964 U1 | 11/2006 |

* cited by examiner

*Primary Examiner* — Glenn Dayoan
*Assistant Examiner* — Gregory Blankenship
(74) *Attorney, Agent, or Firm* — Quinn Law Group, PLLC

(57) ABSTRACT

An energy absorber device is provided that includes a generally cylindrical member defining an axis and having an outer surface. One or more axially-spaced, substantially annular members are operatively connected to the generally cylindrical member at the outer surface to create areas of stress concentration in the generally cylindrical member, such that deformation of the generally cylindrical member due to a sufficient force applied to the generally cylindrical member is initiated at the areas of stress concentration, with the areas of stress concentration being reinforced by the substantially annular members. The areas of stress concentration act as crush initiation features and are formed by the connection of the substantially annular members to the generally cylindrical member. Thus, expensive tooling, such as preformed dies, to form the initiation features in the generally cylindrical member is not required.

19 Claims, 5 Drawing Sheets

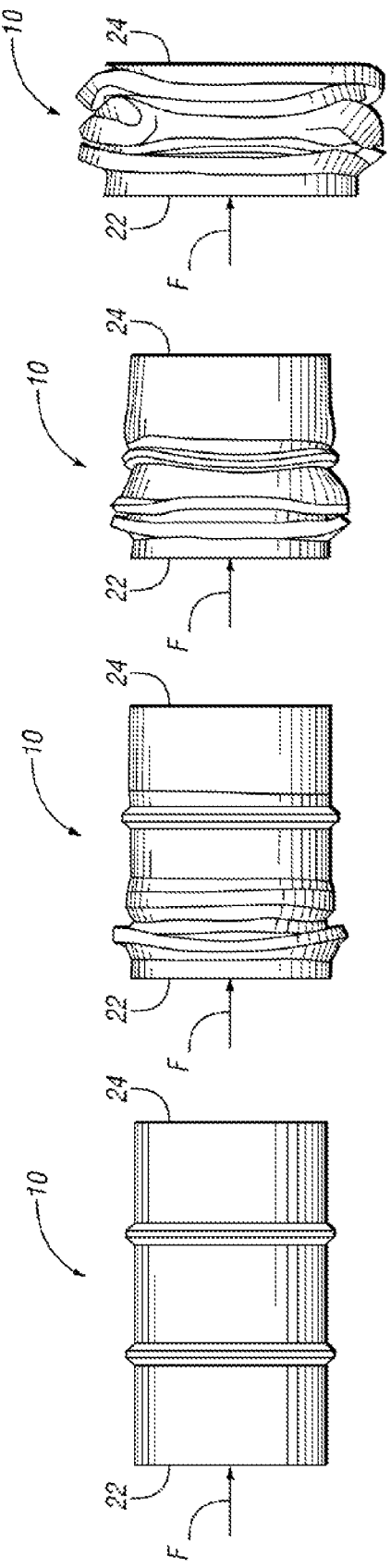

ENERGY ABSORBER DEVICE AND METHOD OF FORMING SAME

TECHNICAL FIELD

The invention relates to an energy absorber device, such as an energy absorber device for a vehicle, and a method of forming the device.

BACKGROUND

Automotive vehicles are typically designed to absorb impact energy to protect the passenger compartment in the event of an impact. For example, the vehicle frame rail is designed to absorb a significant amount of energy. Additional energy absorber devices are sometimes used to provide localized areas of energy absorption in order to prevent or limit deformation of surrounding components.

SUMMARY

An energy absorber device is provided that includes a generally cylindrical member defining an axis and having an outer surface. One or more axially-spaced, substantially annular members are operatively connected to the generally cylindrical member at the outer surface. The connection of the substantially annular member or members creates stress concentration areas in the generally cylindrical member, such that deformation of the generally cylindrical member due to a sufficient force applied to the generally cylindrical member is initiated at the stress concentration areas. As used herein, a stress concentration area is an area of the cylindrical member in which stress due to an applied force tends to be greater than in other areas due to the configuration of the area. The stress concentration areas are reinforced by the surrounding annular member or members. The stress concentration areas act as crush initiation features and are formed by the connection of the substantially annular member or members to the generally cylindrical member. Thus, expensive tooling, such as preformed dies, to form the initiation features in the cylindrical member is not required.

In one embodiment, the one or more substantially annular members are compressed onto the cylindrical member, such as by crimping. The compressing action creates the deformations of the cylindrical member that serves as crush initiation features. Thus, deformation begins at the crush initiation features, but reinforcement by the surrounding substantially annular member or members absorbs some of the energy, limiting deformation of the cylindrical member.

In another embodiment, the one or more substantially annular members are welded to the cylindrical member. The area of the cylindrical member adjacent the weld is a stress concentration area, serving as a crush initiation feature.

The energy absorber device may be used in a vehicle. For example, the energy absorber device may be connected between a vehicle bumper and a frame rail, or between an instrument panel and a knee bolster component.

A method of forming the energy absorber device includes forming a generally cylindrical member that defines an axis. Forming the cylindrical member may be by seamless welding, extrusion, or roll forming with seam welding, but is not limited to such processes. The method also includes placing one or more axially-spaced, substantially annular members around the generally cylindrical member, and operatively connecting the substantially annular member or members to the generally cylindrical member to thereby create stress concentration areas in the cylindrical member. For example, the substantially annular member or members may be compressed onto the cylindrical member, such as by crimping, creating localized deformations that act as stress concentration areas. The device can then be installed between two components connected at either end of the cylindrical member. The number and spacing of the substantially annular members, as well as the thickness and strength of the cylindrical member can be varied to achieve desired energy absorption capabilities.

Because the crush initiation features are formed during assembly and need not be stamped into the cylindrical member, the cost of specialized dies to stamp the cylindrical member is avoided. Also, the device is easily modified for different applications, such as by changing the number or axial position of the substantially annular members.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIGS. 3A-3D are schematic side view illustrations of the device of FIGS. 1 and 2A-2B at various stages of deformation during an impact event;

DETAILED DESCRIPTION

Figure 1:
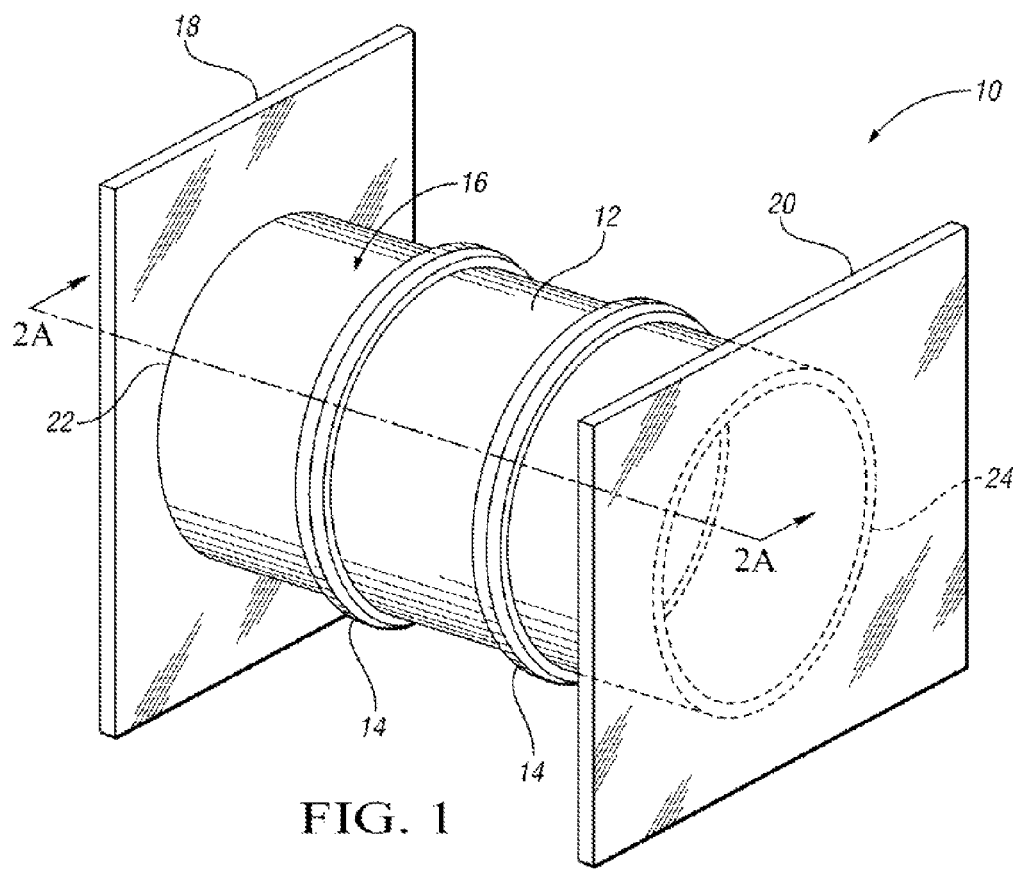
FIG. 1 is a schematic perspective illustration of one embodiment of an energy absorber device.

Referring to the drawings, wherein like numbers refer to like components throughout the several views, FIG. 1 shows an energy absorber device 10 configured to control the absorption of impact energy. The energy absorbing device 10 includes a generally cylindrical member 12 with annular members 14 operatively connected to an outer surface 16 of the cylindrical member 12 to create stress concentration areas 13 (shown best in FIG. 2B), also referred to as crush initiation features, the function of which is discussed below. The annular members 14 need not be complete rings, but are substantially annular. First and second mounting plates 18, 20 are connected to a first end 22 and a second end 24, respectively, of the cylindrical member 12. The construction and assembly of these components of the energy absorber device 10 is explained in greater detail below.

In the embodiment shown in FIG. 1, the cylindrical member 12 is a steel tube. The tube may be a seamless welded tube, an extruded tube, or may be roll-formed and seam welded, but is not limited to such. Such steel tubing would be lower in cost than a stamped steel cylindrical member having stamped crush initiation features, because specialized dies would be required for stamped crush initiation features. Alternatively, the cylindrical member 12 could be a steel pipe, having thicker walls than a steel tube. The cylindrical member 12 could be an extruded aluminum alloy instead of steel, or could be a plastic material. The choice of material and the specifications of the cylindrical member 12 would be based on the desired crash energy absorption performance of the device 10, and could be fine tuned using crash energy analysis.

Figure 2A:
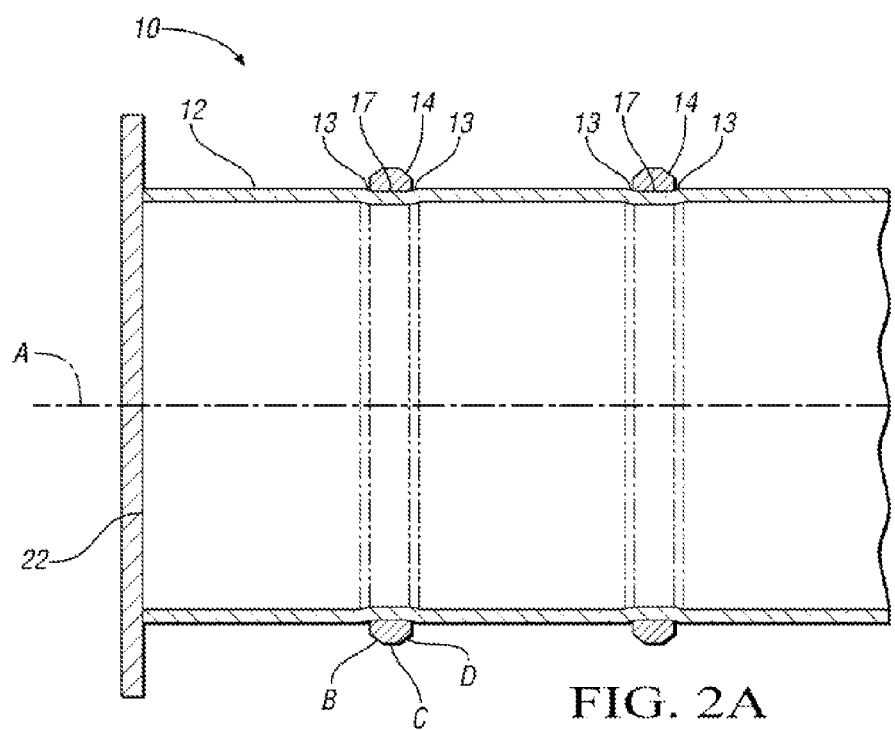
FIG. 2A is a schematic cross-sectional illustration in partial fragmentary view of the device of FIG. 1 taken at arrows 2A-2A of FIG. 1.

FIG. 2A shows the two annular members 14 axially spaced along center axis A defined by the cylindrical member 12. In this embodiment, the annular members 14 are operatively connected to the cylindrical member 12 by crimping. Compression of the annular members 14 by crimping locally deforms portions 17 of the cylindrical member 12 that are radially surrounded by the annular members 14 to form stress concentration areas 13. The deformed portions 17 are smaller in radial cross-section than the remainder of the cylindrical member 12, creating stress concentration areas 13 at or adjacent the deformed portions. The annular members 14 are configured to be stronger than the cylindrical member 12, and so act to absorb energy of the deformation that is initiated at the stress concentration areas 13 when an impact force F is applied to the end 22, as shown in FIGS. 3A-3D. This ability to absorb deformation energy limits the axial movement of end 22 toward end 24 due to impact force F. As shown in FIGS. 3B, 3C and 3D, the force F causes deformation so that end 22 moves toward end 24. Deformation energy is absorbed by the annular members 14 at the stress concentration areas 13 in axial progression from the end 22 toward the end 24 as time increases from the initial impact in FIG. 3A to the final state of the energy absorbing device 10 in FIG. 3D. The state of the energy absorber device 10 at the end of the crush resulting from the impact force F shown in FIG. 3D shows end 22 spaced from end 24 further than would be the case if the annular members 14 were not placed at the stress concentration areas 13 to absorb some of the impact energy. The energy absorber device 10 with stress concentration areas 13 helps to control deformation of the cylindrical member 12 and movement of end 22 toward end 24.

Figure 2B:
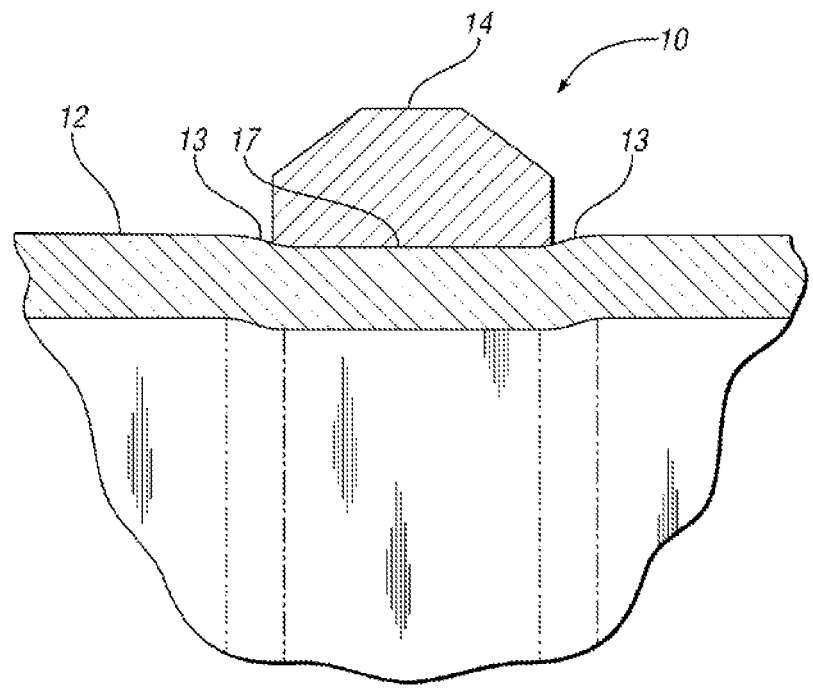
FIG. 2B is a schematic cross-sectional illustration in partial fragmentary view of an annular member crimped to the cylindrical member of the device of FIG. 1.

Referring to FIGS. 2A and 2B, optionally, the annular members 14 each have a multi-sided outer surface, as shown by sides B, C and D. The multi-sided outer surface allows two crimping tools to be placed on surfaces B and D, respectively, to compress the annular members 14 in respective directions perpendicular to the sides B and D and generally radially inward. The multi-sided outer surface of each annular member 14 helps to control the compressive force around the entire periphery of the annular member 14, creating a very symmetrical deformed portion 17, which enables highly accurate crush performance modeling. Other means of compressing the annular members 14 to the cylindrical member 12 may also be used, such as by compressing small spaced pegs radially inward about the periphery of the annular members 14 to compress the annular members 14 at the spaced locations about the periphery.

Figure 2C:
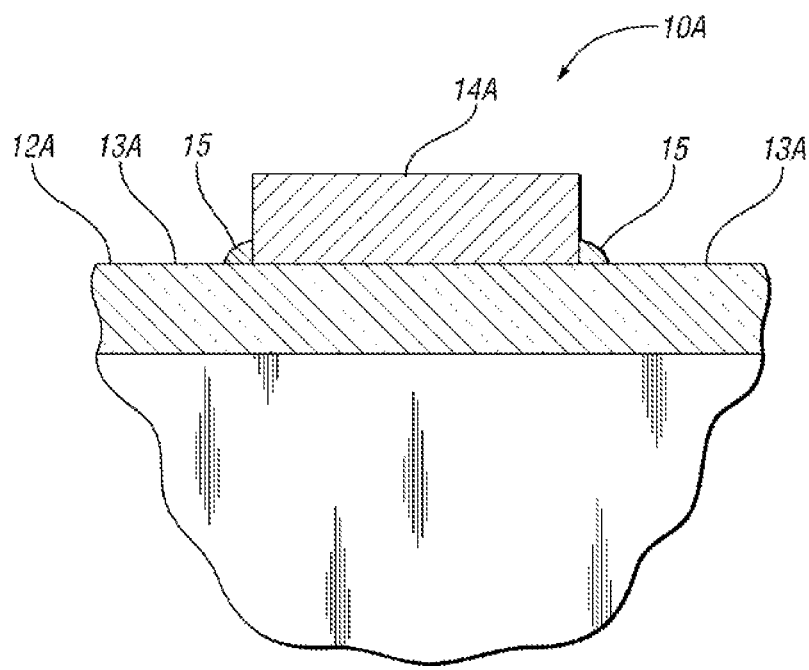
FIG. 2C is a schematic cross-sectional illustration in partial fragmentary view of an alternate embodiment of a device like that of FIG. 1 having annular members welded to the cylindrical member.

Referring to FIG. 2C, an alternate energy absorber device 10A includes a cylindrical member 12A that may be formed by any of the methods described above with respect to the cylindrical member 12, and may be of any of the materials described with respect to cylindrical member 12. One of more annular members 14A are axially-spaced along cylindrical member 12A, similarly to annular members 14 of FIGS. 1-2B. The annular members 14A are welded to the cylindrical member 12A, as indicated at weld areas 15. The weld material and the weld process, such as the rate of cooling of the weld, are selected so that the cylindrical member 12A is stronger at the welded areas 15, creating stress concentration areas 13A on either side of the annular members 14A and welded areas 15. The stress concentration areas 13A act as crush initiation features, so that initial deformation of the cylindrical member 12A will be at the stress concentration areas 13A. The cylindrical member 12A is reinforced by the annular member 14A. Thus, when a force is applied to an end of the cylindrical member 12A, similar to force F of FIG. 3A, the annular members 14A absorb some of the deformation energy, reducing the axial compression of the cylindrical member 12A. Because the annular members 14A are welded instead of crimped to the cylindrical member 12A, the annular members 14A do not have multiple outer side surfaces, although it could have such surfaces and would perform equally well with such.

Figure 4:
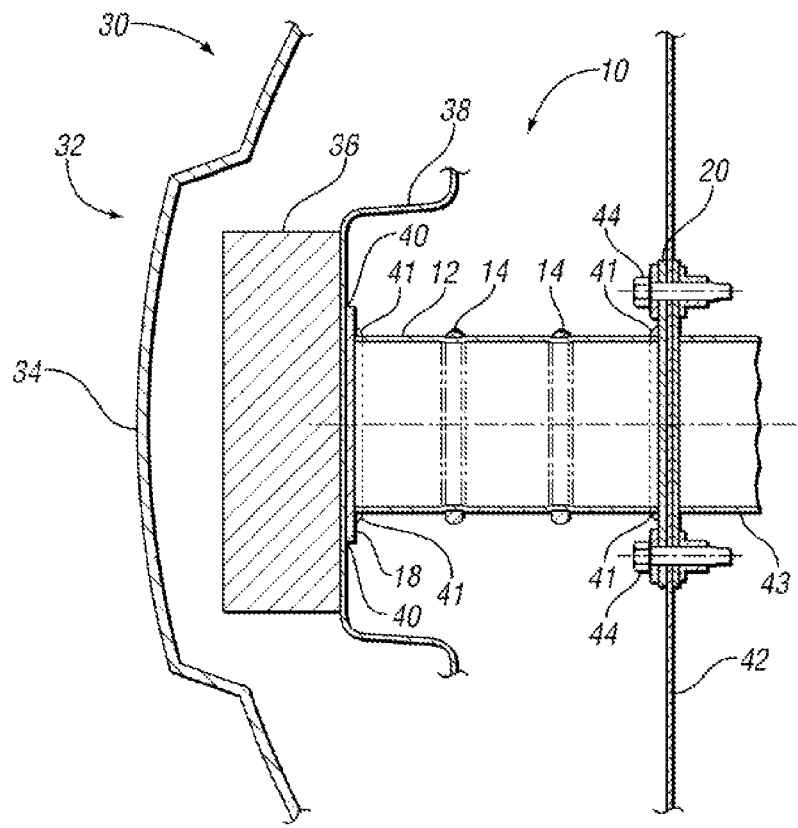
FIG. 4 is a schematic cross-sectional illustration in partial fragmentary view of a front portion of a vehicle with the device of FIGS. 1 and 2A-2B installed between a bumper and a frame rail.

FIG. 4 shows one application of the energy absorbing device 10 in a vehicle 30. The energy absorbing device 10 is used in a bumper assembly 32, which may be a front or rear bumper assembly. The bumper assembly 32 includes a fascia 34 spaced outward of a foam or plastic spacer 36. The spacer 36 is mounted on a bumper beam 38. The first and second mounting plates 18, 20 of the energy absorber device 10 are welded to the ends of the cylindrical member 12 at welds 41. The first mounting plate 18 of the energy absorber device 10 is welded to the bumper beam 38 at weld areas 40. Alternately, the first mounting plate 18 may be bolted or otherwise secured to the bumper beam 38. The second mounting plate 20 is bolted to a flange 42 of the vehicle frame rail 43 with bolts 44. The second mounting plate 20 may be secured to the frame rail 43 by other means instead. By installing the energy absorber device 10 between the bumper beam 38 and the frame rail 43, some of the energy of an impact force transferred through the fascia 34 and foam spacer 36 to the bumper beam 38 is absorbed through deformation of the energy absorber device 10, to control movement of the bumper beam 38 toward the frame rail 43.

Figure 5:
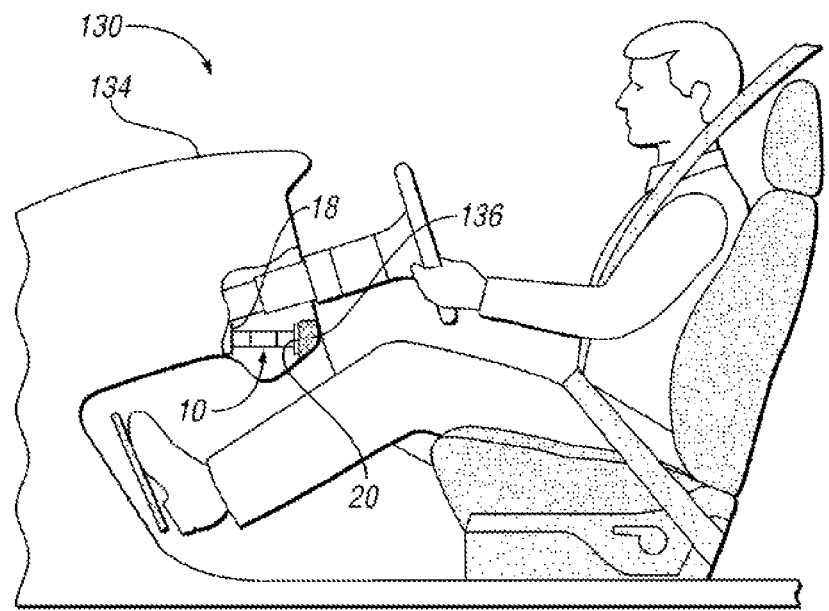
FIG. 5 is a schematic side illustration in partial fragmentary view of a portion of a vehicle with the device of FIGS. 1 and 2A-2B installed between a vehicle instrument panel and a knee bolster component.

FIG. 5 shows another application of the energy absorber device 10 in a vehicle 130. The energy absorber device 10 has a first mounting plate 18 at one end mounted to an instrument panel 134. Second mounting plate 20 is mounted at a second end of the energy absorber device 10 to a knee bolster component 136, such as foam. An impact force applied to the instrument panel 134 in the direction of the energy absorber device 10 will cause the energy absorber device 10 to absorb at least some of the impact energy, with deformation energy being absorbed by the annular members 14 (see FIG. 1) to control progression of the first end 22 toward the second end 24 (see FIGS. 3A-3D).

Figure 6:
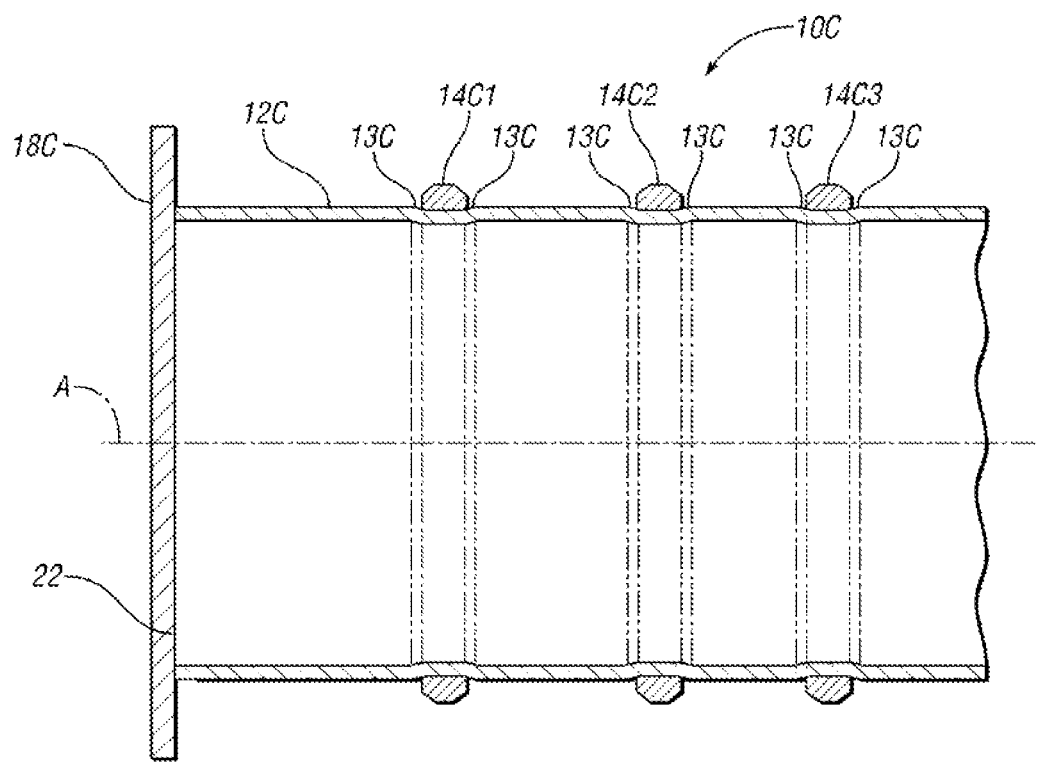
FIG. 6 is a schematic cross-sectional illustration in partial fragmentary view of another embodiment of an energy absorber device.

Referring to FIG. 6, another alternate embodiment of an energy absorber device 10C is illustrated. Only the first mounting plate 18C is shown attached to one end 22C of the energy absorber device 10C. A second mounting plate is attached to the other end (not shown) of the energy absorber device 10C. Energy absorber device 10C has generally cylindrical member 12C that may be formed by any of the methods described above with respect to the cylindrical member 12, and may be of any of the materials described with respect to cylindrical member 12. Multiple substantially annular members 14C1, 14C2, and 14C3 are axially spaced on and operatively connected to an outer surface of cylindrical member 12C by crimping, as described with respect to annular members 14 of FIGS. 1-2B, to create areas of stress concentration 13C radially surrounded by the annular members 14C. There are a different number of annular members 14C than annular members 14, and the annular members 14 are spaced differently than annular members 14C. Spacing between adjacent pairs of annular members 14C1 and 14C2 is greater than the spacing between adjacent pairs 14C2 and 14C3. The number and spacing of the annular members 14C is dependent on the desired deformation characteristics of the energy absorber device 10C. Impact analysis may be performed to determine the optimum number and spacing of annular members 14C to achieve the desired deformation characteristics.

Figure 7:
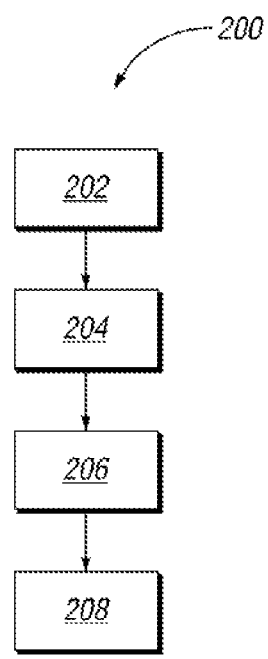
FIG. 7 is a flow chart showing a method of forming any of the energy-absorbing devices of FIGS. 1-6.

Referring now to FIG. 7, a method 200 of manufacturing and installing an energy absorbing device such as energy absorbing devices 10, 10A and 10C of FIGS. 1-6 is illustrated. The method 200 begins with step 202, forming a generally cylindrical member 12, 12A or 12C. Forming the cylindrical member may be by seamless welding, extrusion, roll forming with seamless welding, or any other appropriate manufacturing method. After the cylindrical member is formed, the method 200 moves to step 204, placing one or more annular members 14, 14A, or 14C around the cylindrical member 12, 12A or 12C in an axially-spaced arrangement. The number and spacing of the annular members 14, 14A and 14C is dependent on the desired energy deformation characteristics in the particular application of the energy absorbing device 10, 10A, or 10C.

In step 206, the annular members 14, 14A or 14C are operatively connected to the cylindrical member 12, 12A or 12C to create areas of stress concentration 13, 13A or 13C. This may be accomplished by compressing the annular members to the generally cylindrical members 12, 12A or 12C, such as by crimping as described above. Alternatively, this may be accomplished by welding the annular members 14, 14A or 14C to the cylindrical members 12, 12A or 12C. Once operatively connected, the annular members 14, 14A or 14C serve to absorb deformation energy when the cylindrical member 12, 12A or 12C is initially deformed at the areas of stress concentration 13, 13A, 13C.

Finally, in step 208, the energy absorber device 10, 10A, or 10C is installed between two components that are connected at either end of the energy absorber device 10, 10A, or 10C. In FIG. 4, step 208 is illustrated with energy absorber device 10 installed between bumper beam 38 and frame rail 43. In FIG. 5, step 208 is illustrated with energy absorber device 10 installed between instrument panel 134 and knee bolster component 136. The energy absorber device 10 is useful for other applications, including non-vehicle applications, in which controlled energy absorption is required.

Accordingly, the energy absorber devices 10, 10A, or 10C and the method 200 described herein provide simple manufacture and applications of energy absorber devices to control deformation of components resulting from an impact.

While the best modes for carrying out the invention have been described in detail, those familiar with the art to which this invention relates will recognize various alternative designs and embodiments for practicing the invention within the scope of the appended claims.

The invention claimed is:

1. An energy-absorbing device comprising:
    a generally cylindrical member defining an axis and having an outer surface; and
    at least one substantially annular member operatively connected to the generally cylindrical member at the outer surface to create areas of stress concentration in the generally cylindrical member, such that deformation of the generally cylindrical member is initiated at the areas of stress concentration due to application of sufficient force to the generally cylindrical member, with the areas of stress concentration being reinforced by the surrounding at least one annular member; wherein the at least one substantially annular member extends axially no further than the areas of stress concentration.

2. The energy-absorbing device of claim 1, wherein the at least one substantially annular member is compressed onto the generally cylindrical member.

3. The energy absorber device of claim 2, wherein the at least one substantially annular member has a multi-sided outer surface.

4. The energy-absorbing device of claim 1, wherein the at least one substantially annular member is welded to the generally cylindrical member.

5. The energy-absorbing device of claim 1, wherein the at least one substantially annular member includes multiple annular members; wherein different adjacent pairs of the annular members are spaced differently from one another.

6. The energy-absorbing device of claim 1, wherein the generally cylindrical member is steel.

7. The energy-absorbing device of claim 1, wherein the at least one substantially annular member is compressed steel.

8. The energy-absorbing device of claim 1, the at least one substantially annular member includes multiple annular members; and further comprising:
    a first component mounted to one end of the generally cylindrical member; and
    a second component mounted to the other end of the generally cylindrical member; wherein the force is applied to the first component in a direction toward the second component and deformation energy caused by the force is absorbed by the annular members in axial order from one of the annular members nearest the first component to another of the annular members nearest the second component.

9. The energy-absorbing device of claim 8, further comprising:
    a vehicle bumper mounted to the first component and a frame rail mounted to the second component.

10. The energy-absorbing device of claim 8, further comprising:
    a vehicle instrument panel mounted to the first component and a knee bolster component mounted to the second component.

11. A vehicle comprising:
    a generally cylindrical steel member defining an axis and having an outer surface;
    multiple axially-spaced, compressed steel substantially annular members operatively connected to the generally cylindrical steel member at the outer surface to deform the generally cylindrical steel member, thereby creating areas of stress concentration in the generally cylindrical steel member that serve as crush initiation features where operatively connected to the generally cylindrical steel member;
    a first vehicle component mounted to one end of the generally cylindrical steel member; and
    a second vehicle component mounted to the other end of the generally cylindrical steel member;
    wherein the substantially annular members are configured to surround and reinforce the areas of stress concentration such that deformation of the generally cylindrical steel member due to a sufficient force applied to the first component in a direction toward the second component is initiated at the areas of stress concentration and energy of the deformation is absorbed by the substantially annular members to thereby limit movement of the first vehicle component toward the second vehicle component.

12. The vehicle of claim 11, wherein the first vehicle component is a bumper and the second vehicle component is a frame rail.

13. The vehicle of claim 11, wherein the first vehicle component is an instrument panel and the second vehicle component is a knee bolster component.

14. The vehicle of claim 11, wherein at least one of the annular members is compressed onto the generally cylindrical steel member.

15. The vehicle of claim 11, wherein at least one of the annular members has a multi-sided outer surface.

16. The vehicle of claim 11, wherein at least one of the annular members is welded to the generally cylindrical steel member.

17. The vehicle of claim 11, wherein different adjacent pairs of the annular members are spaced differently from one another.

18. A method comprising:
    forming a generally cylindrical member that defines an axis;
    placing at least one substantially annular member around the generally cylindrical member;
    operatively connecting the at least one substantially annular member to the generally cylindrical member to thereby create areas of stress concentration that serve as crush initiation features in the cylindrical member;
    installing the generally cylindrical member with the connected at least one substantially annular member thereon between two components connected at either end of the cylindrical member; and
    wherein operatively connecting the at least one substantially annular member to the generally cylindrical member is by welding the at least one substantially annular member to the generally cylindrical member.

19. The method of claim 18, wherein said forming the generally cylindrical member is by seamless welding, extrusion, or roll forming with seam welding.

* * * * *